United States Patent
Lo

(10) Patent No.: US 7,392,412 B1
(45) Date of Patent: Jun. 24, 2008

(54) LOW POWER MODE FOR A NETWORK INTERFACE

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 419 days.

(21) Appl. No.: 11/114,402

(22) Filed: Apr. 26, 2005

Related U.S. Application Data

(63) Continuation-in-part of application No. 09/990,137, filed on Nov. 21, 2001, now Pat. No. 6,993,667.

(60) Provisional application No. 60/256,117, filed on Dec. 15, 2000.

(51) Int. Cl.
*G06F 1/32* (2006.01)

(52) U.S. Cl. .................. 713/320; 713/300; 713/323

(58) Field of Classification Search ................ 713/320, 713/300, 323
See application file for complete search history.

(56) References Cited

U.S. PATENT DOCUMENTS

| | | | |
|---|---|---|---|
| 5,404,544 A | 4/1995 | Crayford | |
| 5,610,903 A | 3/1997 | Crayford | |
| 5,742,833 A | 4/1998 | Dea et al. | |
| 5,884,041 A | 3/1999 | Hurwitz | |
| 5,907,553 A | 5/1999 | Kelly et al. | |
| 5,922,052 A | 7/1999 | Heaton | |
| 6,026,494 A | 2/2000 | Foster | |
| 6,169,475 B1 | 1/2001 | Browning | |
| 6,215,764 B1 | 4/2001 | Wey et al. | |
| 6,266,696 B1 * | 7/2001 | Cromer et al. ............... | 709/224 |
| 6,442,142 B1 | 8/2002 | Bar-Niv | |
| 6,618,392 B1 | 9/2003 | Bray | |
| 6,622,178 B1 | 9/2003 | Burke et al. | |
| 6,795,450 B1 * | 9/2004 | Mills et al. ................... | 370/463 |
| 6,883,025 B2 | 4/2005 | Andra et al. | |
| 7,127,521 B2 * | 10/2006 | Hsu et al. ..................... | 709/233 |
| 7,127,624 B2 * | 10/2006 | Berman et al. .............. | 713/320 |
| 2002/0157030 A1 | 10/2002 | Barker et al. | |
| 2004/0066301 A1 | 4/2004 | Browning | |

OTHER PUBLICATIONS

U.S. Appl. No. 09/990,137, filed Nov. 21, 2001, Lo.
U.S. Appl. No. 09/991,046, filed Nov. 21, 2001, Daryl Hoot et al.
U.S. Appl. No. 11/070,481, filed Mar. 2, 2005, Timothy Donovan et al.
U.S. Appl. No. 09/990,137, filed Nov. 21, 2001, William Lo.
Marvell; Yukon-EC PCI Express based Gigabit Ethernet Controller 88E8050, 2004.

(Continued)

*Primary Examiner*—Nitin C. Patel

(57) ABSTRACT

A network interface comprises a medium access control (MAC) device and/or a host interface. A regulator module communicates with the MAC device and/or the host interface and provides a first voltage level during an inactive mode and a second voltage level during an active mode. A physical layer (PHY) device that communicates with the MAC device and/or the host interface and the regulator module and that includes an energy detect module that detects energy on a medium during the inactive mode and an energy save module. The energy save module starts timing a first period and the regulator module transitions the MAC device and/or the host interface to the second voltage level when the energy is detected during the inactive mode. External communication with the MAC device and/or the host interface is enabled after the first period is up.

46 Claims, 5 Drawing Sheets

OTHER PUBLICATIONS

IEEE Std 802.3-2002 (Revision of Std 802.3, 2000 Edition), IEEE Standard for Information technology—Telecommunications and information exchange between systems—Local and metropolitan area networks—Specific requirements, Part 3: Carrier sense multiple access with collision detection (CSMA/CD) access method and physical layer specifications; IEEE Computer Society, Sponsored by the LAN/MAN Standards Committee, Mar. 8, 2002; 1546 pages.

* cited by examiner

LOW POWER MODE FOR A NETWORK INTERFACE

CROSS-REFERENCE TO RELATED APPLICATIONS

This application is a continuation in part of U.S. patent application Ser. No. 09/990,137 [now U.S. Pat. No. 6,993,667 B1] that was filed on Nov. 21, 2001 and claims the benefit of U.S. Provisional Application Ser. No. 60/256,117 that was filed on Dec. 15, 2000, which are both hereby incorporated by reference.

FIELD OF THE INVENTION

The present invention relates to network devices, and more particularly to energy saving modules for network devices.

BACKGROUND OF THE INVENTION

Referring now to FIG. 1, host devices 10, such as computers, personal digital assistants (PDA's) and/or network enabled devices and/or appliances, commonly include a network interface 12 for communicating with other hosts or link partners over a medium. The network interface 12 draws power from a power source associated with the host device 10.

Referring now to FIG. 2, the network interface 12 typically includes a host interface 14 that provides an interface to the host device 10. A MAC device/buffer 18 includes logic that bridges a physical layer (PHY) device 20 and the host interface 14. The PHY device 20 communicates with a wired or wireless medium 21. In some implementations, the host interface 14 is compatible with a peripheral component interconnect (PCI) and/or PCI-Express (PCI-E) protocols. A regulator module 22 may be provided that receives a first voltage level from the host device 10 and converts the first voltage level to a second voltage level for use in the network interface 12.

The power that is dissipated by the network interface 12 tends to cause undesirable heat generation. For portable host devices 10, the power consumption of the network interface 12 also tends to reduce battery life of the host device 10.

SUMMARY OF THE INVENTION

A network interface comprises a medium access control (MAC) device. A regulator module that communicates with the MAC device and that provides a first voltage level during an inactive mode and a second voltage level during an active mode. A physical layer (PHY) device communicates with the MAC device and the regulator module. The PHY device includes an energy detect module that detects energy on a medium during the inactive mode and an energy save module. The energy save module starts timing a first period and the regulator module transitions the MAC device to the second voltage level when the energy is detected during the inactive mode. External communication with the MAC device is enabled after the first period is up.

In other features, the energy save module starts timing a second period and the regulator module transitions the MAC device to the first voltage level when a link is lost during the active mode. The energy detect module begins detecting activity on the medium after the second period is up. The energy save module starts timing a third period when a link is lost during the active mode. The regulator module transitions the PHY device from the second voltage level to the first voltage level when the third period is up. The first voltage level is less than the second voltage level and is greater than zero.

In yet other features, the energy save module starts timing a fourth period and the regulator module transitions the PHY device from the first voltage level to the second voltage level when activity is detected by the energy detect module during the inactive mode. The regulator module transitions the PHY device from the second voltage level to the first voltage level when the PHY device fails to establish a link within the fourth period. The energy save module starts timing a fifth period during the inactive mode. The fifth period is reset when activity is detected. When the fifth period is up, the energy save module starts timing a sixth period, the regulator module transitions the PHY device to the active mode, and the PHY device sends a pulse. The regulator module transitions the PHY device to the inactive mode when the sixth period is up unless the energy detect module detects activity before the sixth period is up. A clock module generates a clock signal. At least one of the MAC device and the PHY device includes a digital module that receives the clock signal during the active mode and that does not receive the clock signal during the inactive mode.

A network interface comprises a medium access control (MAC) means for providing an interface. Regulator means communicates with the MAC means and provides a first voltage level during an inactive mode and a second voltage level during an active mode. Physical layer (PHY) means communicates with the MAC means and the regulator means and includes energy detect means for detecting energy on a medium during the inactive mode and energy save means for controlling transitions between the active and inactive modes. The energy save means starts timing a first period and the regulator means transitions the MAC means to the second voltage level when the energy is detected during the inactive mode. External communication with the MAC means is enabled after the first period is up.

The energy save means starts timing a second period and the regulator means transitions the MAC means to the first voltage level when a link is lost during the active mode. The energy detect means begins detecting activity on the medium after the second period is up. The energy save means starts timing a third period when a link is lost during the active mode. The regulator means transitions the PHY means from the second voltage level to the first voltage level when the third period is up. The first voltage level is less than the second voltage level and is greater than zero. The energy save means starts timing a fourth period and the regulator means transitions the PHY means from the first voltage level to the second voltage level when activity is detected by the energy detect means during the inactive mode. The regulator means transitions the PHY means from the second voltage level to the first voltage level when the PHY means fails to establish a link within the fourth period. The energy save means starts timing a fifth period during the inactive mode. The fifth period is reset when activity is detected. When the fifth period is up, the energy save means starts timing a sixth period, the regulator means transitions the PHY means to the active mode, and the PHY means sends a pulse.

In other features, the regulator means transitions the PHY means to the inactive mode when the sixth period is up unless the energy detect means detects activity before the sixth period is up. Clock means generates a clock signal. At least one of the MAC means and the PHY means includes a digital module that receives the clock signal during the active mode and that does not receive the clock signal during the inactive mode.

A network interface comprises a host interface and a regulator module that communicates with the host interface and that provides a first voltage level during an inactive mode and a second voltage level during an active mode. A physical layer (PHY) device communicates with the host interface and the regulator module. The PHY device includes an energy detect module that detects energy on a medium during the inactive mode and an energy save module. The energy save module starts timing a first period and the regulator module transitions the host interface to the second voltage level when the energy is detected during the inactive mode. External communication with the host interface is enabled after the first period is up.

In other features, the energy save module starts timing a second period and the regulator module transitions the host interface to the first voltage level when a link is lost during the active mode. The energy detect module begins detecting activity on the medium after the second period is up. The energy save module starts timing a third period when a link is lost during the active mode. The regulator module transitions the PHY device from the second voltage level to the first voltage level when the third period is up. The first voltage level is less than the second voltage level and is greater than zero.

In yet other features, the energy save module starts timing a fourth period and the regulator module transitions the PHY device from the first voltage level to the second voltage level when activity is detected by the energy detect module during the inactive mode. The regulator module transitions the PHY device from the second voltage level to the first voltage level when the PHY device fails to establish a link within the fourth period. The energy save module starts timing a fifth period during the inactive mode. The fifth period is reset when activity is detected. When the fifth period is up, the energy save module starts timing a sixth period, the regulator module transitions the PHY device to the active mode, and the PHY device sends a pulse. The regulator module transitions the PHY device to the inactive mode when the sixth period is up unless the energy detect module detects activity before the sixth period is up. A clock module generates a clock signal. At least one of the host interface and the PHY device includes a digital module that receives the clock signal during the active mode and that does not receive the clock signal during the inactive mode.

A network interface comprises host interface means for providing an interface. Regulator means communicates with the host interface means and provides a first voltage level during an inactive mode and a second voltage level during an active mode. Physical layer (PHY) means communicates with the host interface means and the regulator means and includes energy detect means for detecting energy on a medium during the inactive mode and energy save means for controlling transitions between the active and inactive modes. The energy save means starts timing a first period and the regulator means transitions the host interface means to the second voltage level when the energy is detected during the inactive mode. External communication with the host interface means is enabled after the first period is up.

The energy save means starts timing a second period and the regulator means transitions the host interface means to the first voltage level when a link is lost during the active mode. The energy detect means begins detecting activity on the medium after the second period is up. The energy save means starts timing a third period when a link is lost during the active mode. The regulator means transitions the PHY means from the second voltage level to the first voltage level when the third period is up. The first voltage level is less than the second voltage level and is greater than zero. The energy save means starts timing a fourth period and the regulator means transitions the PHY means from the first voltage level to the second voltage level when activity is detected by the energy detect means during the inactive mode. The regulator means transitions the PHY means from the second voltage level to the first voltage level when the PHY means fails to establish a link within the fourth period. The energy save means starts timing a fifth period during the inactive mode. The fifth period is reset when activity is detected. When the fifth period is up, the energy save means starts timing a sixth period, the regulator means transitions the PHY means to the active mode, and the PHY means sends a pulse.

In other features, the regulator means transitions the PHY means to the inactive mode when the sixth period is up unless the energy detect means detects activity before the sixth period is up. Clock means generates a clock signal. At least one of the host interface means and the PHY means includes a digital module that receives the clock signal during the active mode and that does not receive the clock signal during the inactive mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
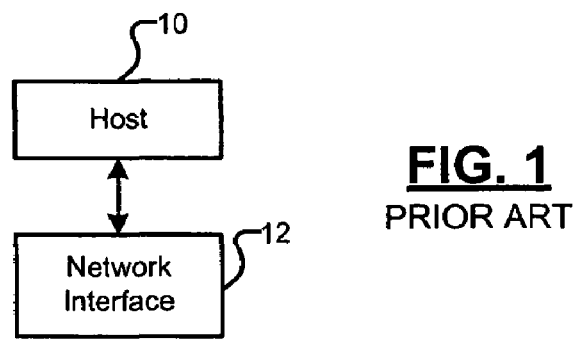
FIG. 1 is a functional block diagram of host device and network interface according to the prior art.
Figure 2:
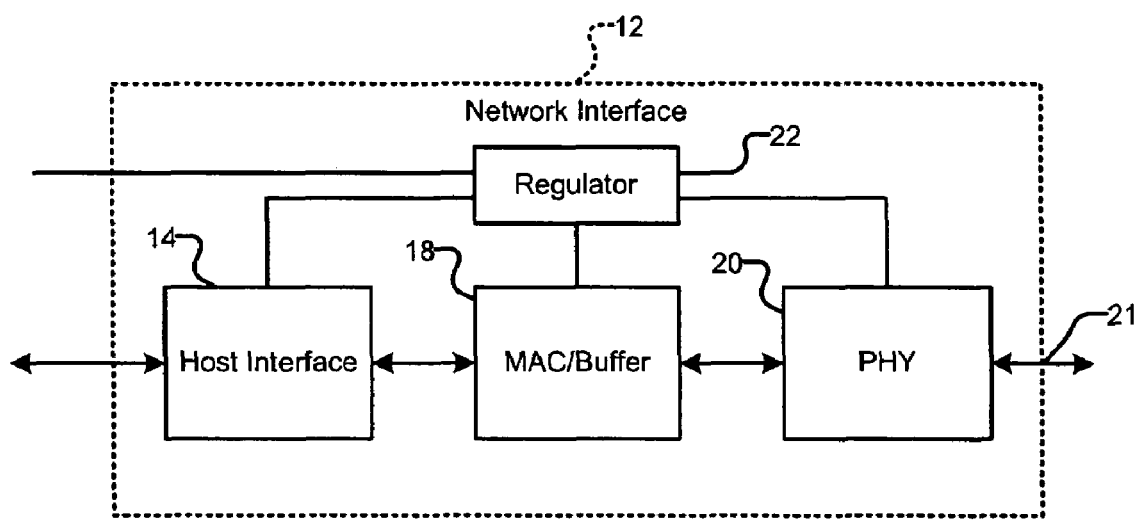
FIG. 2 is a functional block diagram of the network interface of FIG. 1 in further detail.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group), and memory that execute one or more software or firmware programs, a combinational logic circuit, and/or other suitable components that provide the described functionality. For purposes of clarity, the same reference numerals will be used to identify similar elements. References to logical one, true, and on are equivalent to each other, and references to logical zero, false, and off are equivalent to each other, unless otherwise noted. Parts or all of the invention may also be implemented with equivalent embodiments using logic that is inverted from that disclosed.

Figure 3:
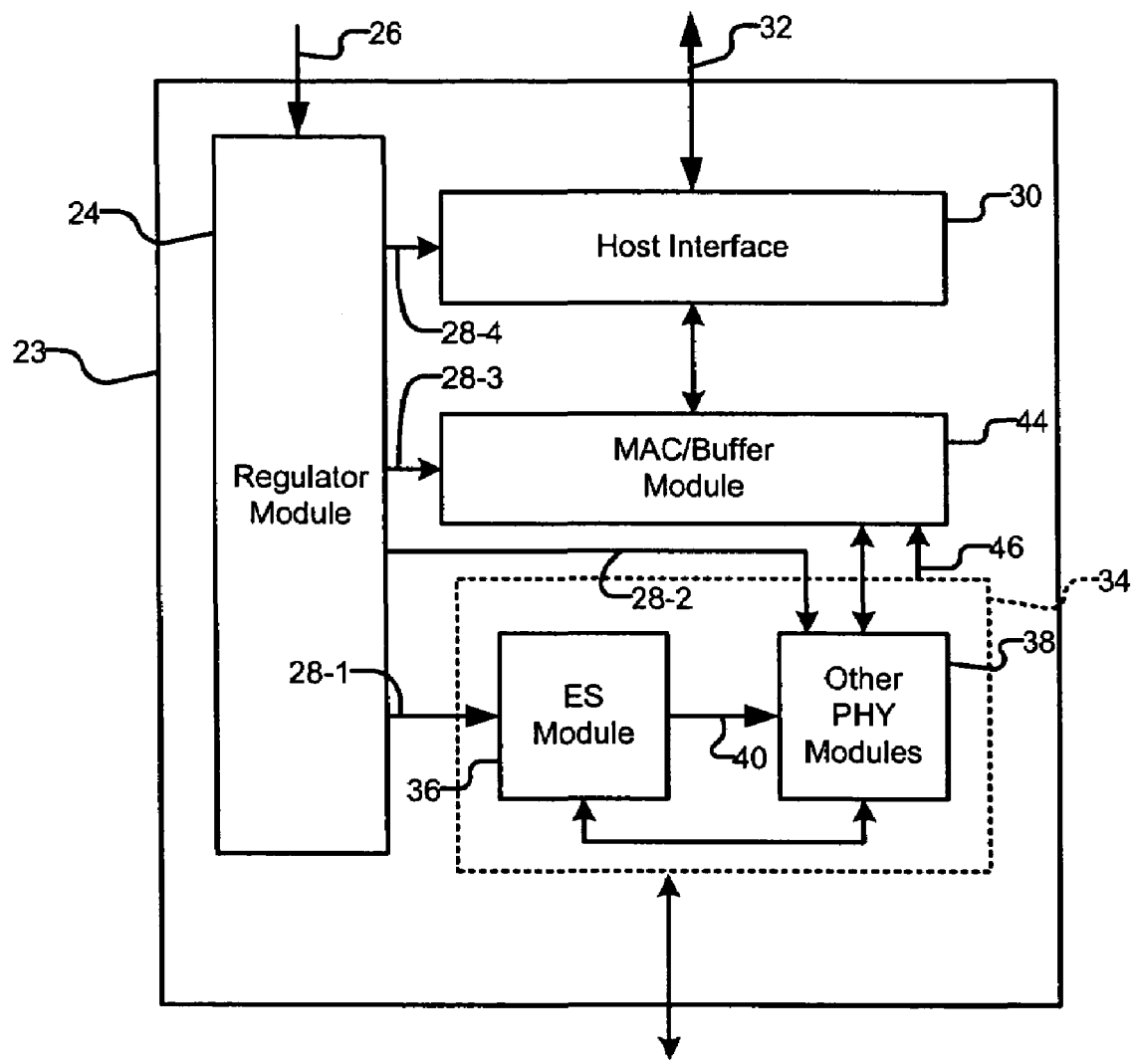
FIG. 3 is a functional block diagram of a network interface.

Referring now to FIG. 3, a block diagram of a network interface 23 is shown. A regulator module 24 has a power input 26 that receives power from the host device 10. A plurality of regulator module outputs 28-1, 28-2, 28-3, and 28-4 (collectively regulator module outputs 28) provide power to other modules of the network interface 12. A host interface 30 provides bidirectional communication with the host device 10.

A physical layer (PHY) device 34 includes an energy savings module (ESM) 36 and other PHY device modules 38. The ESM 36 has an output 40 that switches at least some of the PHY device modules 38 between active and inactive power modes depending upon link status and activity. A medium access control (MAC) device 44 communicates with the host device 10 through the host interface 30. The MAC device 44 also communicates with the PHY device 34 and receives a link status signal 46 indicating the presence or absence of a link.

Figure 4:
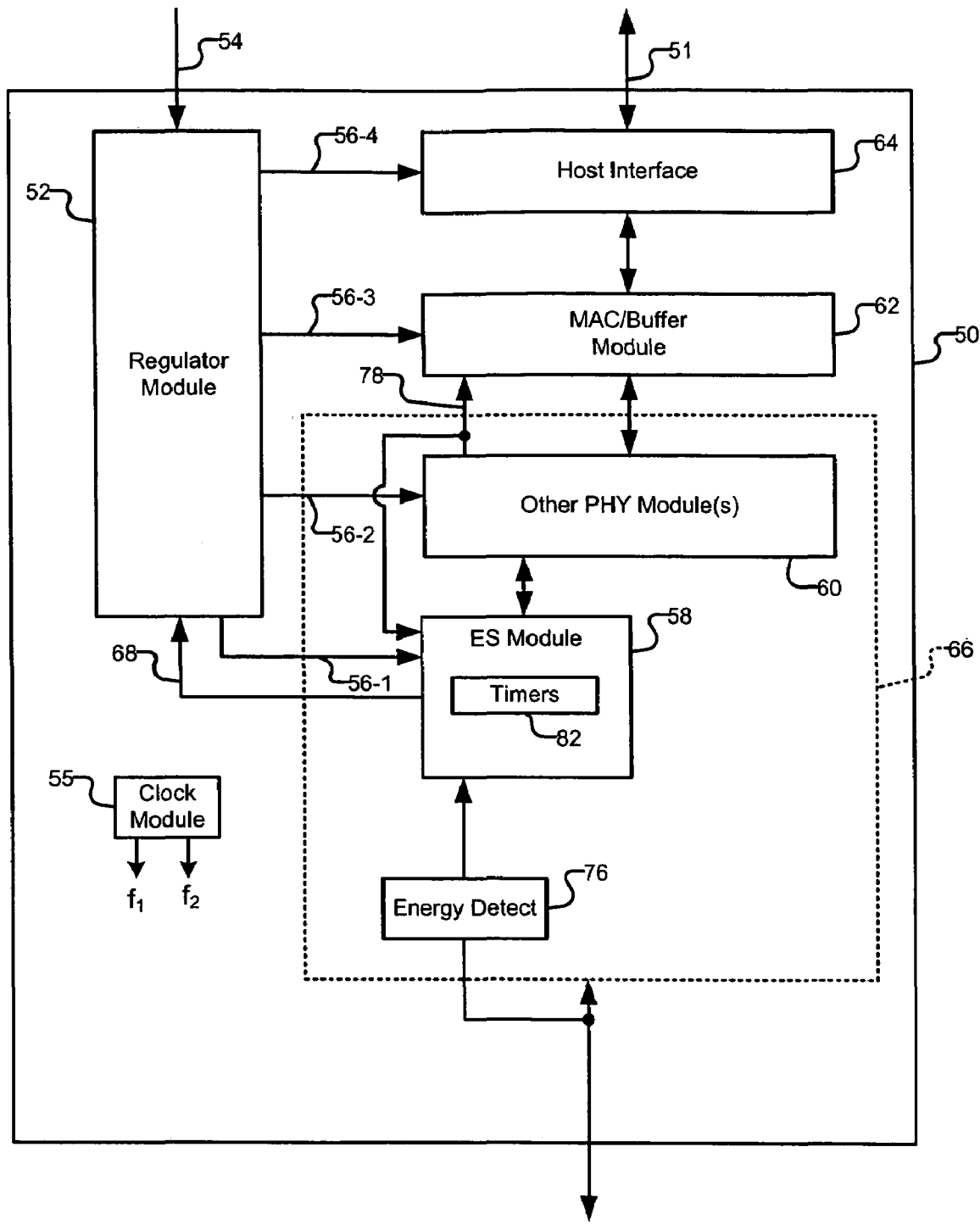
FIG. 4 is a functional block diagram of a network interface according to the present invention.

Referring now to FIG. 4, an improved network interface 50 is shown connected to the host device 10. A regulator module 52 has a power input 54 that receives power from the host device 10. A clock module 55 generates at least first and second clock signals. The first or lower clock signal may be used to supply low voltage logic running during the inactive mode. The second or higher clock signal may be used during the active mode for higher speed logic. The clock module 55 may include a clock generator, a phase-locked loop (PLL), an oscillator and/or any other circuit to generate the two clock signals. To simplify FIG. 4, skilled artisans will appreciate that individual connections from the clock module 55 to components in the network interface are present but not shown.

The regulator module 52 has a plurality of regulator module outputs 56-1, 56-2, 56-3, and 56-4 that are referred to collectively as the regulator module outputs 56. The regulator module outputs 56-1, 56-2, 56-3 and 56-4 provide power to a PHY device 66, a MAC device 62, and a host interface 64, respectively.

The PHY device 66, the MAC device 62, and the host interface 64 include one or more analog and/or digital modules. Analog modules can be powered during the active mode and either powered or not powered (0 volts) during the inactive mode. Analog modules that are not powered typically require settling time when transitioning back to the active mode. Digital modules can be powered at a second or higher voltage level during the active mode. Digital modules can be powered at a first or lower voltage level during the inactive mode to maintain logic states. Digital modules can receive a higher clock signal during the active mode and a lower clock signal (for logic that runs during the inactive mode) or no clock signal during the inactive mode.

One or more of the regulator module outputs 56 are individually switchable between two or more output voltages. In a some implementations, the regulator module outputs 56 are switchable between two non-zero voltages. The first voltage is selected to be sufficient to place the host interface 64 and the MAC device 62 in a standby condition to retain data. The second voltage is greater than the first voltage and is selected to allow the host interface 64, the MAC device 62, and a PHY device 66 to be fully operational. The PHY device 66 communicates with a medium 67. For analog modules that are not powered, a third voltage or ground can be provided and/or a switched ground connection. A voltage selection signal 68 determines whether the first voltage or the second voltage is applied by each of the regulator module outputs 56 as will be described below.

The MAC device 62, which may contain a data buffer, is in bidirectional communication with the host interface 64 and the PHY device 66. The PHY device 66 selectively negotiates link parameters of a link. A link status signal 78 from the PHY device 66 provides the MAC device 62 with an indication of whether the PHY device 66 has established a link.

The ESM 58 includes one or more timers 82 and generates an energy signal that is used to indicate operational states of the network interface 50. A first timer TMR1 is reset when energy exceeding a predetermined threshold is detected by an energy detect module 76. TMR1 is used to limit the amount of time that the PHY device 66 attempts to establish a link after activity is detected and is subsequently not detected. When the link is lost, the PHY device 66 is powered down and the ESM 58 and the energy detect module 76 remain powered and monitor the medium for activity. When activity is detected, the PHY device 66 is powered up, TMR1 is reset and the PHY device 66 attempts to establish a link. If the TMR1 times out before a link is established, the PHY device 66 returns to the inactive mode.

The energy detect module 76 may be implemented by a low power comparator, which compares signals on the medium 67 to a threshold. The energy detect module 76 may alternatively include a digital input that is driven by an optics module that determines when a sufficient amount of optical energy is received. In some implementations, the PHY device 66 indicates link status. In some implementations, the PHY device 66 may include an autonegotiation module that negotiates link parameters and indicates link status, although the PHY device 66 need not include an autonegotiation module and/or be capable of autonegotiation.

A second timer TMR2 is used by the PHY device 66 to periodically transition the inactive PHY device to active mode and transmit pulses such as link pulses. If two network devices or link partners have power save functionality, both devices may remain inactive for an indefinite period while listening for activity. Therefore, even if activity is not detected, the PHY device 66 is periodically powered up when TMR2 times out and link pulses are sent. Upon receiving the link pulses, a link partner will detect activity, exit the inactive mode and attempt to establish a link.

Additional timers TMR3 and TMR4 are used to track time after state changes, which are described later herein, to provide settling times between selected state changes and/or sufficient time to complete processes. An energy signal provides an indication that a receive signal exceeds a threshold. The ESM 58 also generates the voltage selection signal 68.

Figure 5:
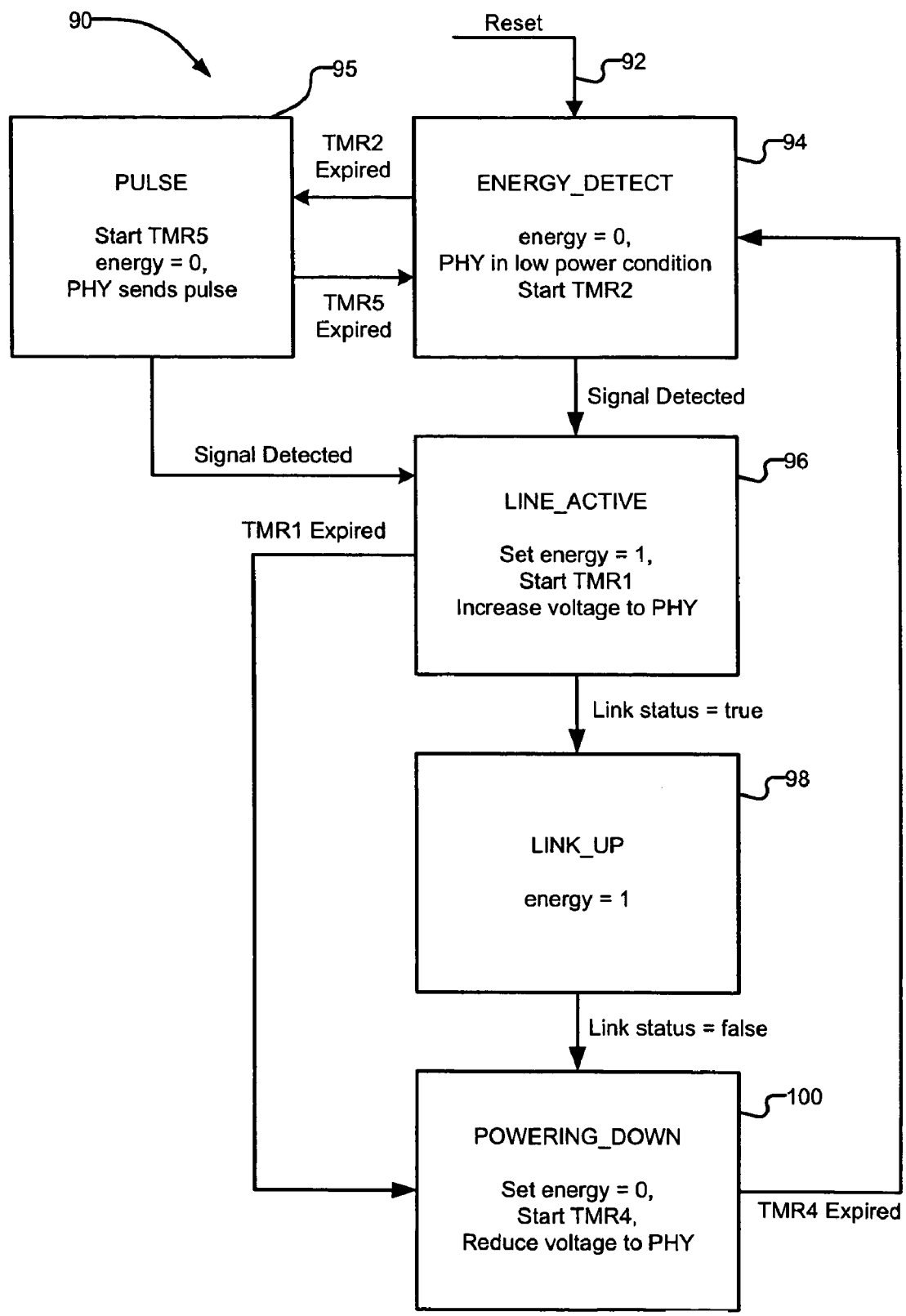
FIG. 5 is a state diagram of power management for a physical layer (PHY) device.

Referring now to FIG. 5, a state diagram 90 of the PHY device 66 is shown. Upon receiving a reset signal 92, the regulator module outputs 56 are set to the first voltage and the PHY device 66 enters an ENERGY_DETECT state 94. The ESM 58 sets the energy signal to false, thereby indicating that the PHY device 66 is waiting for activity on the medium. The PHY device 66 remains in a low power condition. TMR2 is started. When TMR2 expires, the PHY device 66 changes to a PULSE state 95. In the PULSE states, TMR5 is started, energy=0 and the PHY sends a pulse. If a signal is not detected, the PHY device transitions to a LINE_ACTIVE state 96. Alternatively, if TMR5 expires, the PHY returns to the ENERGY_DETECT state 94. TMR5 expires when the pulse is detected. When the energy detect module 76 detects activity as described above, the PHY device 66 changes to a LINE_ACTIVE state 96.

In the LINE_ACTIVE state 96, the ESM 58 changes the energy signal from false to true, indicating that activity has been detected. The receive signal starts TMR1. The false to true transition of the energy signal causes the ESM 58 to switch the regulator module outputs 56 to the second voltage. The PHY device 66 also attempts to establish a communication link. When the PHY device 66 establishes the communication link, as indicated by the link status signal 78, it leaves the LINE_ACTIVE state 96 and enters a LINK_UP state 98.

In the LINK_UP state 98, the energy signal remains true. The PHY device 66 remains in the LINK_UP state 98 until it loses the communication link as indicated by the link status signal 78 changing from true to false. Upon losing the communication link the PHY device 66 leaves the LINK_UP state 98 and enters a POWERING_DOWN state 100.

In the POWERING_DOWN state 100, the PHY device 66 starts TMR4 and changes the energy signal from true to false. The MAC device 62 responds to the link status signal 78 becoming false by preparing for the regulator module output 56-3 to return to the first voltage. TMR4 expires after a predetermined time, which may be different from the predetermined time the PHY device returns to the ENERGY_DETECT state.

Discussion will now return to the LINE_ACTIVE state 96. If the receive signal activity ceases and TMR1 expires before the PHY device 66 establishes the communication link, the PHY device 66 will change to the POWERING_DOWN state 100.

Figure 6:
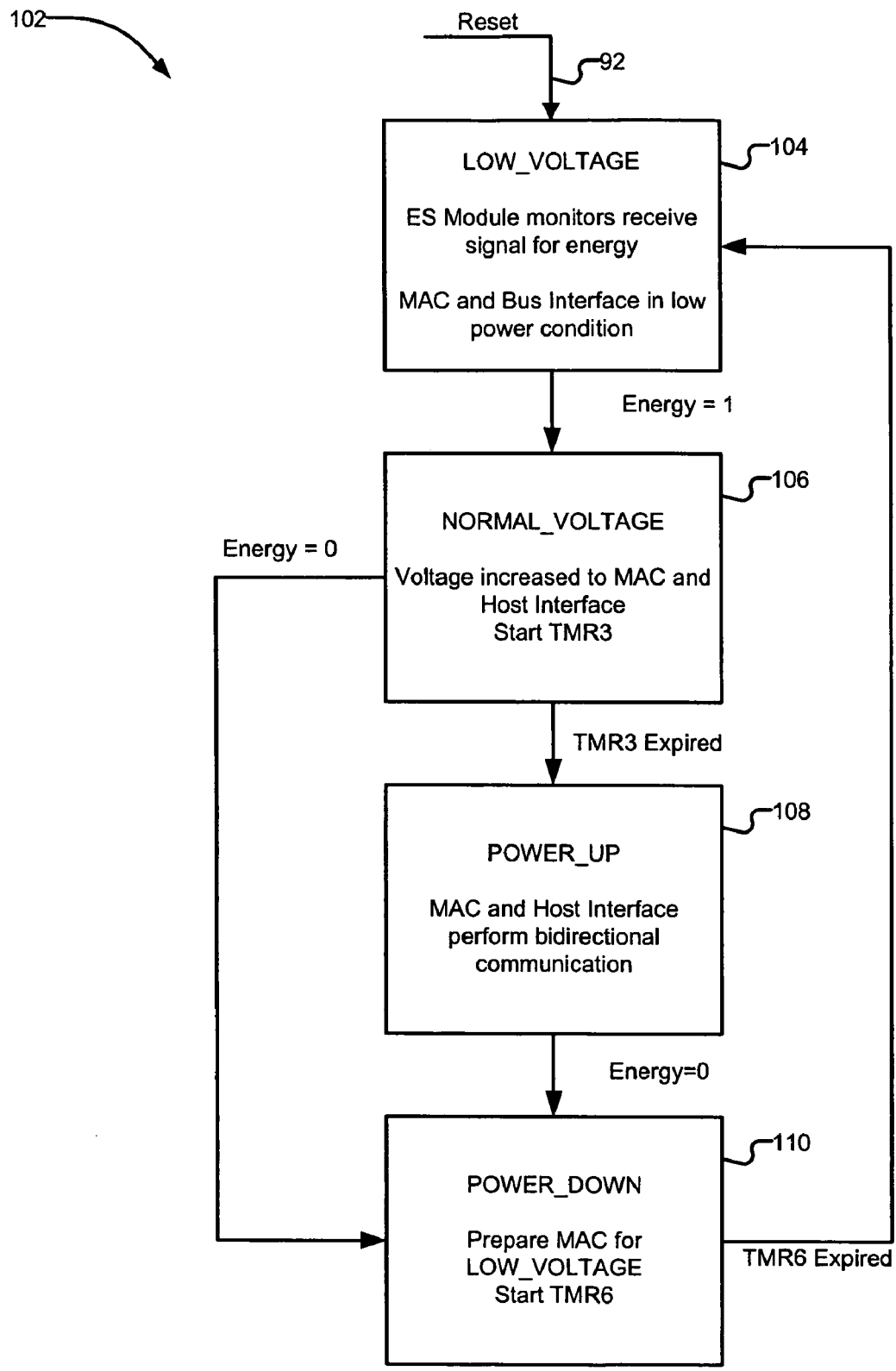
FIG. 6 is a state diagram of power management for a medium access control (MAC) device and a host interface.

Referring now to FIG. 6, a state diagram 102 of the MAC device 62 and the host interface 64 is shown. Upon receiving the reset signal 92, the regulator module outputs 56 are set to the first voltage and the MAC device 62 and the host interface 64 enter a LOW_VOLTAGE state 104. The LOW_VOLTAGE state 104 allows the MAC device 62 and the host interface 64 to have lower leakage currents than when the regulator module outputs 56 are at the second voltage. When the energy signal 88 changes from false to true and/or link status changes to false, the ESM 58 increases the regulator module outputs 56-3 and 56-4 to the second voltage, thereby changing the MAC device 62 and the host interface 64 to a NORMAL_VOLTAGE state 106.

Upon entering the NORMAL_VOLTAGE state 106, the MAC device 62 and the host interface 64 are provided time to stabilize from the voltage increase TMR3 is also started. When TMR3 expires, the MAC device 62 and the host interface 64 change to a POWER_UP state 108.

In the POWER_UP state 108, the MAC device 62 and the host interface 64 are fully operational and the regulator module outputs 56 are at the second voltage. The MAC device 62 and the host interface 64 remain in the POWER_UP state 108 until the link status signal 78 changes from true to false. Upon link status signal 78 being changed, the MAC device 62 and the host interface 64 change to a POWER_DOWN state 110.

Upon entering the POWER_DOWN state 110, the MAC device 62 and the host interface 64 begin preparing for the regulator module lines 56-3 and 56-4 to return to the first voltage. For example, the MAC device 62 may prepare by emptying its buffer if so equipped, or by preparing other internal registers for the voltage change. TMR6 is started. Upon expiration of TMR6, the ESM 58 switches the regulator module outputs 56, thereby returning the MAC device 62 and the host interface 64 to the LOW_VOLTAGE state 104.

Returning now to the NORMAL_VOLTAGE state 94. If the PHY device 66 changes the energy signal 88 from true to false, then the MAC device 62 and the host interface 64 will transition to from the NORMAL_VOLTAGE state 106 directly to the POWER_DOWN state 110.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A network interface, comprising:
   a medium access control (MAC) device;
   a regulator module that communicates with said MAC device and that provides a first voltage level during an inactive mode and a second voltage level during an active mode; and
   a physical layer (PHY) device that communicates with said MAC device and said regulator module and that includes:
   an energy detect module that detects energy on a medium during said inactive mode, and
   an energy save module,
   wherein said energy save module starts timing a first period and said regulator module transitions said MAC device to said second voltage level when said energy is detected during said inactive mode, and wherein external communication with said MAC device is enabled after said first period is up.

2. The network interface of claim 1 wherein said energy save module starts timing a second period and said regulator module transitions said MAC device to said first voltage level when a link is lost during said active mode, and wherein said energy detect module detects activity on said medium after said second period is up.

3. The network interface of claim 2 wherein said regulator module transitions said MAC device to said first voltage level during said second period.

4. The network interface of claim 1 wherein said energy save module starts timing a third period when a link is lost during said active mode, wherein said regulator module transitions said PHY device from said second voltage level to said first voltage level when said third period is up.

5. The network interface of claim 1 wherein said first voltage level is less than said second voltage level and is greater than zero.

6. The network interface of claim 1 wherein said energy save module starts timing a fourth period and said regulator module transitions said PHY device from said first voltage level to said second voltage level when activity is detected by said energy detect module during said inactive mode.

7. The network interface of claim 6 wherein said regulator module transitions said PHY device from said second voltage level to said first voltage level when said PHY device fails to establish a link within said fourth period.

8. The network interface of claim 6 wherein said fourth period is associated with at least one of a settling time and a processing time of said PHY device.

9. The network interface of claim 6 wherein said PHY device settles to said second voltage level after said first period and before establishing a link.

10. The network interface of claim 1 wherein said energy save module starts timing a fifth period during said inactive mode, wherein said fifth period is reset when activity is detected, and wherein when said fifth period is up, said energy save module starts timing a sixth period, said regulator module transitions said PHY device to said active mode, and said PHY device sends a pulse.

11. The network interface of claim 10 wherein said regulator module transitions said PHY device to said inactive mode when said sixth period is up unless said energy detect module detects activity before said sixth period is up.

12. The network interface of claim 10 wherein said sixth period is associated with a settling time of said PHY device, and wherein said PHY device sends said pulse after said sixth period.

13. The network interface of claim 10 wherein said PHY device refrains from sending a pulse during said sixth period.

14. The network interface of claim 1 further comprising a clock module that generates a clock signal, wherein at least one of said MAC device and said PHY device includes a digital module that receives said clock signal during said active mode and that does not receive said clock signal during said inactive mode.

15. The network interface of claim 1 wherein said regulator module provides said first voltage level and said second voltage level to said MAC device during said inactive mode and said active mode, respectively.

16. The network interface of claim 1 wherein voltage to said MAC device increases from said first voltage level to said second voltage level during said first period.

17. The network interface of claim 16 wherein said MAC device settles to said second voltage level during said first period before enabling communication with said MAC device.

18. A method for operating network interface including a medium access control (MAC) device, comprising:
providing a first voltage level during an inactive mode and a second voltage level during an active mode; and
detecting energy on a medium during said inactive mode;
timing a first period and transitioning said MAC device that is in communication with PHY device to said second voltage level when said energy is detected during said inactive mode; and
enabling external communication with said MAC device after said first period is up.

19. The method of claim 18 further comprising:
timing a second period and transitioning said MAC device to said first voltage level when a link is lost during said active mode; and
detecting activity on said medium after said second period is up.

20. The method of claim 18 further comprising:
timing a third period when a link is lost during said active mode; and
transitioning said PHY device from said second voltage level to said first voltage level when said third period is up.

21. The method of claim 18 wherein said first voltage level is less than said second voltage level and is greater than zero.

22. The method of claim 18 further comprising timing a fourth period and transitioning said PHY device from said first voltage level to said second voltage level when activity is detected by said energy detect module during said inactive mode.

23. The method of claim 22 further comprising transitioning said PHY device from said second voltage level to said first voltage level when said PHY device fails to establish a link within said fourth period.

24. The method of claim 18 further comprising:
timing a fifth period during said inactive mode, wherein said fifth period is reset when activity is detected; and
when said fifth period is up, timing a sixth period, transitioning a PHY device to said active mode, and sending a pulse on said medium.

25. The method of claim 24 further comprising transitioning said PHY device to said inactive mode when said sixth period is up unless said energy detect module detects activity before said sixth period is up.

26. The method of claim 18 further comprising generating a clock signal, wherein at least one of said MAC device and said PHY device includes a digital module that receives said clock signal during said active mode and that does not receive said clock signal during said inactive mode.

27. A network interface, comprising:
a host interface device;
a regulator module that communicates with said host interface and that provides a first voltage level during an inactive mode and a second voltage level during an active mode; and
a physical layer (PHY) device that communicates with said host interface and said regulator module and that includes:
an energy detect module that detects energy on a medium during said inactive mode, and
an energy save module,
wherein said energy save module starts timing a first period and said regulator module transitions said host interface to said second voltage level when said energy is detected during said inactive mode, and wherein external communication with said host interface is enabled after said first period is up.

28. The network interface of claim 27 wherein said energy save module starts timing a second period and said regulator module transitions said host interface to said first voltage level when a link is lost during said active mode, and wherein said energy detect module detects activity on said medium after said second period is up.

29. The network interface of claim 27 wherein said energy save module starts timing a third period when a link is lost during said active mode, wherein said regulator module transitions said PHY device from said second voltage level to said first voltage level when said third period is up.

30. The network interface of claim 27 wherein said first voltage level is less than said second voltage level and is greater than zero.

31. The network interface of claim 27 wherein said energy save module starts timing a fourth period and said regulator module transitions said PHY device from said first voltage level to said second voltage level when activity is detected by said energy detect module during said inactive mode.

32. The network interface of claim 31 wherein said regulator module transitions said PHY device from said second voltage level to said first voltage level when said PHY device fails to establish a link within said fourth period.

33. The network interface of claim 27 wherein said energy save module starts timing a fifth period during said inactive mode, wherein said fifth period is reset when activity is detected, and wherein when said fifth period is up, said energy save module starts timing a sixth period, said regulator module transitions said PHY device to said active mode, and said PHY device sends a pulse.

34. The network interface of claim 33 wherein said regulator module transitions said PHY device to said inactive mode when said sixth period is up unless said energy detect module detects activity before said sixth period is up.

35. The network interface of claim 27 further comprising a clock module that generates a clock signal, wherein at least one of said host interface and said PHY device includes a digital module that receives said clock signal during said active mode and that does not receive said clock signal during said inactive mode.

36. The network interface of claim 27 further comprising a MAC device that is coupled between said host interface device and said PHY device.

37. The network interface of claim 27 wherein said host interface device is coupled between a host and said PHY device.

38. A method for operating network interface including a host interface, comprising:
   providing a first voltage level during an inactive mode and a second voltage level during an active mode; and
   detecting energy on a medium during said inactive mode;
   timing a first period and transitioning said host interface, that is in communication with a PHY device via a medium access control (MAC) device, to said second voltage level when said energy is detected during said inactive mode; and
   enabling external communication with said host interface after said first period is up.

39. The method of claim 38 further comprising:
   timing a second period and transitioning said host interface to said first voltage level when a link is lost during said active mode; and
   detecting activity on said medium after said second period is up.

40. The method of claim 38 further comprising:
   timing a third period when a link is lost during said active mode; and
   transitioning said PHY device from said second voltage level to said first voltage level when said third period is up.

41. The method of claim 38 wherein said first voltage level is less than said second voltage level and is greater than zero.

42. The method of claim 38 further comprising timing a fourth period and transitioning said PHY device from said first voltage level to said second voltage level when activity is detected by said energy detect module during said inactive mode.

43. The method of claim 42 further comprising transitioning said PHY device from said second voltage level to said first voltage level when said PHY device fails to establish a link within said fourth period.

44. The method of claim 38 further comprising:
   timing a fifth period during said inactive mode, wherein said fifth period is reset when activity is detected; and
   when said fifth period is up, timing a sixth period, transitioning said PHY device to said active mode, and sending a pulse on said medium.

45. The method of claim 44 further comprising transitioning said PHY device to said inactive mode when said sixth period is up unless said energy detect module detects activity before said sixth period is up.

46. The method of claim 38 further comprising generating a clock signal, wherein at least one of said host interface and said PHY device includes a digital module that receives said clock signal during said active mode and that does not receive said clock signal during said inactive mode.

* * * * *

UNITED STATES PATENT AND TRADEMARK OFFICE
CERTIFICATE OF CORRECTION

PATENT NO. : 7,392,412 B1
APPLICATION NO. : 11/114402
DATED : June 24, 2008
INVENTOR(S) : William Lo It is certified that error appears in the above-identified patent and that said Letters Patent is hereby corrected as shown below:

Column 5, Line 52      Delete "a" after "In"

Signed and Sealed this

Twenty-third Day of September, 2008

JON W. DUDAS
*Director of the United States Patent and Trademark Office*